United States Patent [19]

Yamazawa et al.

[11] Patent Number: 4,673,451
[45] Date of Patent: Jun. 16, 1987

[54] METHOD FOR MANUFACTURE OF FIBER REINFORCED RESIN STRUCTURE SUCH AS A STEERING WHEEL CORE MEMBER

[75] Inventors: Yasushi Yamazawa; Katsumi Kondo; Yasuhiro Tsutiya; Takatsune Niimi; Takashi Yamamoto; Kunihiro Matsuba, all of Aichi, Japan

[73] Assignee: Toyota Jidosha Kabushiki Kaisha, Toyota, Japan

[21] Appl. No.: 756,319

[22] Filed: Jul. 18, 1985

[30] Foreign Application Priority Data

Sep. 3, 1984 [JP] Japan ............................... 59-184090
Sep. 3, 1984 [JP] Japan ............................... 59-184091

[51] Int. Cl.⁴ ........................ B65H 81/00; B62D 1/04
[52] U.S. Cl. ..................................... 156/172; 74/552
[58] Field of Search ............... 156/172, 173, 175, 169, 156/166; 74/552; 264/258, 257, 103

[56] References Cited

U.S. PATENT DOCUMENTS

| | | | |
|---|---|---|---|
| 3,362,253 | 1/1968 | Ditlinger | 74/579 |
| 3,551,237 | 12/1970 | Cox et al. | 156/175 |
| 3,782,220 | 1/1974 | Ditlinger | 74/579 R |
| 4,183,261 | 1/1980 | Eiselbiechen | 74/579 R |
| 4,419,908 | 12/1983 | Reikowski | 74/552 |

FOREIGN PATENT DOCUMENTS

| | | |
|---|---|---|
| 3038948 | 6/1981 | Fed. Rep. of Germany . |
| 1561120 | 11/1967 | France . |
| 2418487 | 10/1979 | France . |
| 2468156 | 7/1980 | France . |
| 2515094 | 5/1982 | France . |
| 55-91453 | 11/1971 | Japan . |
| 55-115117 | 9/1980 | Japan . |
| 56-57576 | 5/1981 | Japan . |
| 59-143764 | 8/1984 | Japan . |
| 2004835 | 4/1979 | United Kingdom . |
| 2041858 | 9/1980 | United Kingdom . |

*Primary Examiner*—Michael Ball
*Attorney, Agent, or Firm*—Oblon, Fisher, Spivak, McClelland & Maier

[57] ABSTRACT

A method for the manufacture of a fiber reinforced resin structure having branched portions comprising, winding a long continuous resin impregnated fiber strand repeatedly on a molding jig having a predetermined structure, winding said fiber strand tightly around each of the branched portions of the structure, and hardening said resin.

5 Claims, 5 Drawing Figures

METHOD FOR MANUFACTURE OF FIBER REINFORCED RESIN STRUCTURE SUCH AS A STEERING WHEEL CORE MEMBER

BACKGROUND OF THE INVENTION

1. Field of the Invention:

The present invention relates to a method for the manufacture of a fiber reinforced resin structure which is formed of a long continuous fiber strand impregnated with resin, and particularly to a method for the reinforcement of branched parts of a long continuous fiber reinforced resin structure, to a steering wheel core member formed from a long continuous fiber reinforced resin having the branched parts thereof reinforced, and to a method for the manufacture of the steering wheel core member.

2. Description of the Background:

Fiber reinforced resin structures which use a long continuous fiber strand have various advantages such as light weight, high strength, resistance to corrosion, and freedom of design. Studies are under way to explore the feasibility of using such structures as the backbone member for various structures and automobile parts. Fiber reinforced resin (FRP) structures which use a long continuous fiber strand are produced, as described in GB 2004835 for example, by impregnating a long continuous fiber strand (or roving) of glass fibers or carbon fibers with a resin such as an unsaturated polyester resin or epoxy resin, winding the impregnated fiber strand in a predetermined pattern, and subsequently hardening the resin in the fiber strand. When a steering wheel core member is made of the resin impregnated long continuous fiber strand by the procedure just described, the product core member exhibits the same degree of strength as a conventional core member made of iron. However, this technique permits the production of a steering wheel of notably lighter weight, because the resin impregnated fiber strand has a substantially lower density than that of iron.

The FRP structure so produced exhibits a high strength which is sufficient to enable the structure to endure forces exerted thereon in the direction of the length of the fiber, but exhibits no appreciable strength to endure the forces exerted thereon in the direction perpendicular to the length of the fiber. As a result, the branched portions of the structure, where the fiber strands are branched, do not have sufficient strength. When the branched parts are subjected to an external force, the difficulty which arises is that the individual fibers at the branched portions undergo separation.

The steering wheel structure is such that when it is exposed to an external force, a twisting torque and bending load are brought to bear on the branched portions which intervene between the spoke parts and the boss part. When the core member is formed of the aforementioned long continuous fiber strand, since voids occur in the branched portions between the parts corresponding to the spoke of the steering wheel and the part corresponding to the ring of the steering wheel and in the points of juncture of the spoke parts and the boss metal piece as a result of the manner of fabrication of the steering wheel, the steering wheel inevitably possesses insufficient torsional rigidity and bending rigidity and, as a result, the individual fibers which form the FRP yield to separation at the branched portions and in the points of juncture.

A need therefore continues to exist for a method of manufacturing an FRP structure of improved strength properties, particularly at vulnerable parts of the structure.

SUMMARY OF THE INVENTION

Accordingly, one object of the present invention is to provide a method for the manufacture of a long continuous fiber reinforced resin structure which has reinforced branched portions.

Another object of the present invention is to provide a steering wheel core member of a long continuous fiber reinforced resin which is light in weight and has a high strength and which has reinforced branched portions.

Still another object is to provide a method for the manufacture of a steering wheel core member.

Briefly, these objects and other objects of the present invention as hereinafter will become more readily apparent can be attained in a method of manufacturing a fiber reinforced resin structure by repeatedly winding, in a superposed manner, a long continuous, resin impregnated fiber strand around a predetermined jig or molding pattern, and then winding said fiber strand around the branched portions of the structure, thereby reinforcing the branched portions after the superposition of the fiber strand in the axial direction of the structure has been completed.

In the embodiment of the invention in which a steering wheel core member is produced, a long continuous fiber strand impregnated with resin is wound around a predetermined jig and a boss metal piece, thereby forming a core member which is composed of a ring part and spoke parts, said spoke parts interconnecting the ring part and the boss metal piece, and then the fiber strand is wound around the branched portions where the spoke parts join the boss metal piece and the ring part.

In a more specific embodiment of the invention in which a steering wheel core member is produced, the steps in which the resin impregnated fiber strand is wound around the branched portions of the spoke parts which adjoin the ring part and the spoke parts which adjoin the boss metal piece are accomplished by:

(i) fixing in place a cylindrical winding jig provided at one end thereof with a fiber guide,
(ii) having one end of the resin impregnated fiber strand fastened to a spoke part of the wheel and the other end thereof inserted through the fiber guide of the winding jig, and
(iii) rolling the winding jig along the periphery of the spoke part.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
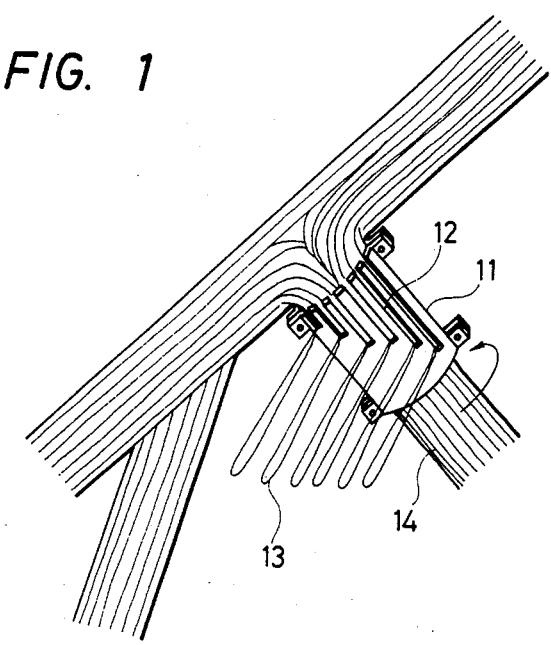
FIG. 1 is a perspective view of a branched portion of an FRP structure to which a winding jig is attached in accordance with the method of the present invention.

In the manufacture of a FRP structure by the repeated winding in a superposed manner of a long continuous fiber strand impregnated with resin around a predetermined jig or molding pattern, the present invention is particularly characterized by the fact that the abovementioned fiber strand is wound around the branched portions of the structure, thereby reinforcing the branched portions after completion of the superpositioning of the fiber strand in the axial direction of the backbone of the structure. In this case, the long continuous resin impregnated fiber strand which is wound for the purpose of reinforcement may be that which is obtained by causing the fiber strand wound in a superposed manner around the branched portions of the structure to be drawn out in a continuous manner, or it may be a long continuous resin impregnated fiber strand prepared apart from the aforementioned fiber strand and which has one end thereof fastened to the branched portions. This fiber strand is tightly wound around the branched portion for the purpose of reinforcement. Because the fiber strand is wound on the branched portion, the individual fibers of the FRP are prevented from otherwise possibly separating and are consequently reinforced.

The excess of the fiber strand which is drawn out in the manner described above and which is used for the reinforcement of the branched portions may be conveniently passed over hooks which are formed separately near the superposed part of the fiber strand in the molding pattern of the structure.

The extent to which the branched portion is consequently reinforced can be controlled by suitably selecting the length and number of loops of the fiber strand to be drawn out.

The jig onto which the aforementioned loops of the fiber strand drawn out are wound does not have to be of a particularly defined structure. A cylindrical winding jig having a plurality of notches cut from one open end thereof toward the other open end thereof and gradually varying in length can be advantageously used. This winding jig may be made of a metallic substance or an FRP. Desirably, it is in the shape of a cylinder which can be separated into two lateral parts along the axial line of the jig so that it is fastened intimately to the structure. The inner terminals of the notches so inserted into the jig should preferably be extended slightly in one and the same circumferential direction so that the loops of the fiber strand which pass through the notches will be prevented form deviating.

The extended loops of the fiber strand are inserted into the inner bent terminals of the notches of the cylindrical winding jig and the winding jig is rotated about its axis. Then, the loops of the fiber strand are drawn by the notches of the winding jig and are easily wound about the periphery of the structure. Since the notches which are inserted in the axial direction of the winding jig are of lengths which vary slightly in a stepwise manner, the loops which are wound into the structure are arranged in such a manner that they are separated by small intervals. By this arrangement, therefore, the loops of the fiber strand can be wound in parallel over a large width.

When the loops of the fiber strand which are drawn out for the purpose of reinforcement of the branched portions are to be used in an uncut form, they may be drawn out in the uppermost of all of the layers of the fiber strand which forms the structure.

The structure in which the fiber strand is wound on the structure for the purpose of reinforcement is not a critical feature of the invention.

The winding of the fiber strand for reinforcement need not be limited to the branched portions of the structure, but may be applied to other linear portions of the structure as well.

The present invention otherwise achieves the reinforcement of the aforementioned branched portion of a given FRP structure by winding the long continuous resin impregnated fiber strand, having one end thereof fastened to the branched portion, onto the branched portion with the aid of a cylindrical winding jig provided at one end thereof with a fiber guide. To be more specific, the fiber strand can be wound around the spoke part of a steering wheel core member for an automobile in a helical fashion, which the spoke part is formed of the fiber strand wound in a superposed manner, by fixing the abovementioned winding jig on the spoke part, fastening one end of the fiber strand to the spoke part, allowing the fiber strand to be paid off through the fiber guide of the winding jig, and rotating the winding jig about its axis and, at the same time, moving the jig in the axial direction of the spoke part. The interval and the direction of the fiber strand which is wound in a helical manner can be varied by varying the extent of the movement of the strand in the spoke part in its axial direction. The fiber strand can be wound in a plurality of layers on the periphery of the spoke part by rotating the winding jig about its axis and, at the same time, reciprocating the jig along the axial direction of the spoke part.

This winding jig may be made of a metallic substance or an FRP. The jig may be in the shape of a cylinder which is capable of being divided laterally into two portions along the axial line of the spoke part so that it can be fastened on the spoke part. Otherwise, the jig may be in the shape of a sheet which is semicircularly curved, until the edges of the same, which are brought toward each other, are separated by an opening barely large enough for the spoke part to be pressed therethrough into the cavity of the curved sheet.

The fiber strand which is wound on the spoke part offers resistance to an applied twisting or bending force and prevents the individual FRP fibers which form the spoke part from mutually separating.

The method described above can be used not only for the manufacture of steering wheels, but also for the manufacture of branched portions of linear structures. It enables the resin impregnated fiber strand to be easily wound about the periphery of any structure of the shape of a bar for the purpose of reinforcing the part so wound.

The long continuous fiber strand which is used in the present invention does not have to be of any particular type. For example, it may be formed of such known fibers as glass fibers and carbon fibers. The thickness and number of fibers so used are not specifically defined. Desirably, a given strand is formed of from 2000 to 30,000 glass fibers each 13 to 23 μm in diameter or as many carbon fibers, each 7 to 10 μm in diameter.

The resin which is used to impregnate the long continuous fiber strand may be any resin previously used in the preparation of FRP structure. Suitable resins include epoxy resins, unsaturated polyester resins, and phenol resins.

Having generally described this invention, a further understanding can be obtained by reference to certain specific examples which are provided herein for purposes of illustration only and are not intended to be limiting unless otherwise specified.

EXAMPLE 1

Figure 2:
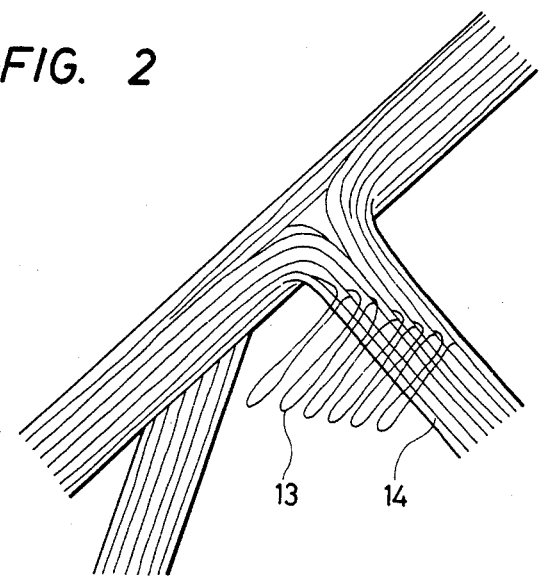
FIG. 2 is a perspective view of the branched portion of the FRP structure of FIG. 1 before the winding with the fiber strand of the present invention is effected.

In the manufacture of an FRP structure by winding a long continuous fiber strand impregnated with resin in a superposed manner around a molding pattern, the fiber strand is drawn out in an elongated loop 13, as a result of being passed around a hook (not shown), said loop being formed apart from the molding pattern as shown in FIG. 2 near a branched portion of the structure and the superposition of the fiber strand is continued further. Again, near the branched portion, the fiber strand is drawn out in an elongated loop 13 as it is passed around the hook, and subsequently the superposition of the fiber strand is continued. By repeating this procedure a predetermined number of times, a predetermined number of elongated loops 13 of the fiber strand are drawn out. After the fiber strand has been superposed in the manner described above, a cylindrical winding jig 11, which has a predetermined number of notches 12 which gradually increase in length along the axial direction of the jig and which is constructed such that it can be divided into two lateral sections along the axial line of the jig, is fastened on the branched portion of the structure 14 as illustrated in FIG. 1. The two sections of the jig open along one of the two edges which join. Then, the loops 13 of the fiber strand which are drawn out in advance are slid in through the notches 12 of the jig, are brought to the inner terminals of the notches, and then are left dangling out of the notches. The winding jig 11 is rotated about its axis. Consequently, the dangling loops 13 of the fiber strand are drawn by the notches 12 and are wound around the structure 14 perpendicularly to the axial direction of the structure 14.

Figure 3:
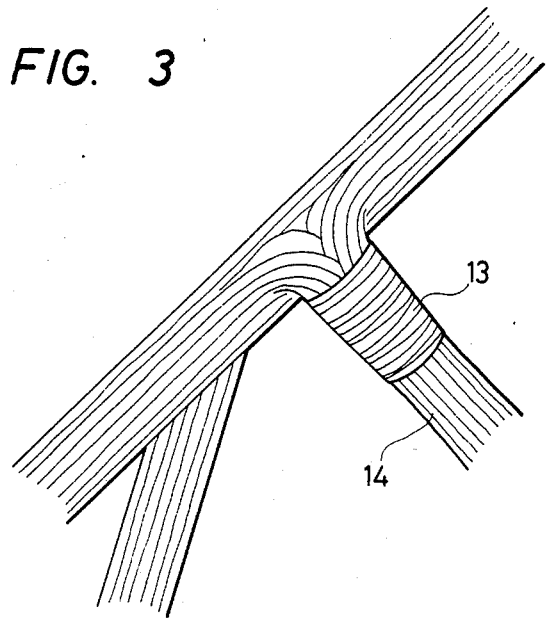
FIG. 3 is a perspective view of the branched portion of the FRP structure already reinforced by the method of the invention.

As a result, an FRP structure having a branched portion of the structure 14 reinforced with the fiber strand 13 wound thereon as illustrated in FIG. 3 is obtained.

EXAMPLE 2

Figure 4:
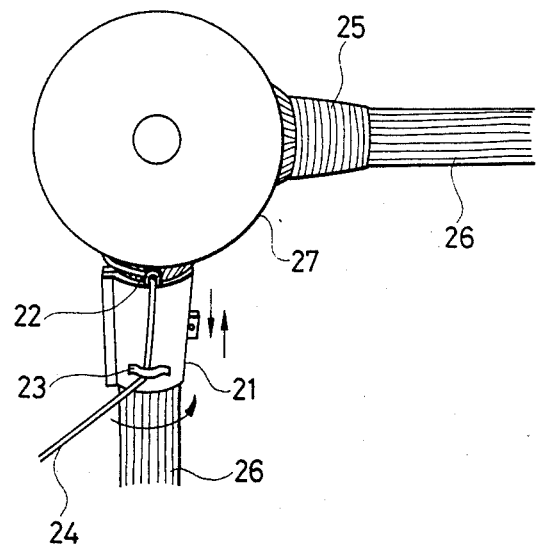
FIG. 4 is a perspective view of branched portions which adjoin a boss metal piece in a steering wheel core member, on which the method of the present invention has been already worked.

A long continuous fiber strand impregnated with resin is wound a predetermined number of times around a steering wheel molding pattern, which has a boss metal piece. The strand forms a steering wheel core member comprising a boss metal piece 27, spoke parts 26, and a ring part. Then, around the portion of the spoke part 26 adjoining the boss metal piece 27 (branched portion of the boss) in the core member formed as described above, a cylindrical winding jig 21 provided at one end thereof with a loop 22 adapted to serve as a fiber guide is fastened in a direction such that the loop 22 falls on the boss metal piece 27 side as illustrated in FIG. 4. This winding jig 21 is constructed so that it can be opened laterally along the axial line of the spoke. When attaching this jig to the spoke part, the jig is kept open so that it is able to admit the spoke part. Then, the long continuous fiber strand 24 impregnated with resin cut to a predetermined length is passed through a loop 23 which is on the outer side of the winding jig 21, and through the aforementioned loop 22 provided at one end of the winding jig, with one end of the fiber strand fastened to the portion of the spoke part 26 adjoining the boss metal piece 27. Subsequently, the winding jig 21 is rotated and, at the same time, moved in the axial direction of the spoke part such that it separates from the boss metal piece 27. As a result, the resin impregnated, fiber strand 24 is paid off through the loop 22 formed at one end of the winding jig 21 being rotated and is moved onto the periphery of the spoke part 6. Consequently, the fiber strand is wound onto the spoke part 26 in the portion thereof adjoining the boss metal piece 27 (branched portion).

Figure 5:
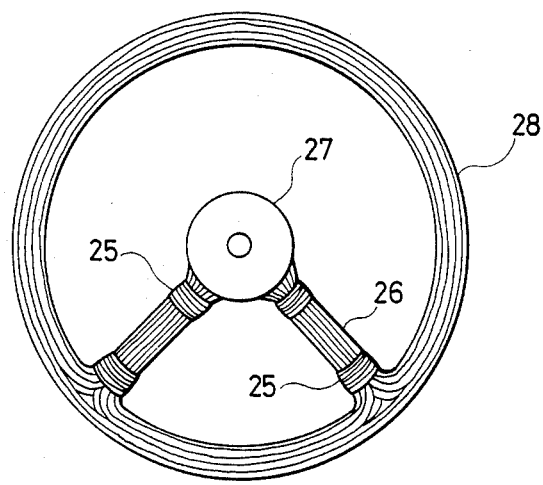
FIG. 5 is a plan view of a FRP steering wheel core member having the branched parts thereof reinforced by the method of the present invention.

Further, the winding jig 21 is rotated and moved in the axial direction opposite to the previously mentioned axial direction, with the result that the resin impregnated fiber strand is wound around the spoke part 26 in the portion thereof adjoining the boss metal piece 27 (branched portion). This procedure is repeated a predetermined number of times. The winding of the resin impregnated long continuous fiber strand is similarly performed on the branched portion intervening between the spoke part 26 and the ring part 28. Consequently, there is obtained a steering wheel core member wherein the branched portions of the boss metal piece and the branched portion which are between the spoke parts and the ring part are severally reinforced as illustrated in FIG. 5.

The orientation of the reinforcing fiber strand 25 can be varied by controlling the ratio of the speed of the movement of the winding jig 21 in the axial direction of the spoke part to the speed of the rotation of the winding jig.

Having now fully described the invention, it will be apparent to one of ordinary skill in the art that many changes and modifications can be made thereto without departing from the spirit or scope of the invention as set forth herein.

What is claimed as new and is desired to be secured by Letters Patent of the United States is:

1. A method for the manufacture of a fiber reinforced resin structure having branched portions, comprising:
   winding a long continuous resin impregnated fiber strand repeatedly on a molding jig having a predetermined structure, said fiber strand near each of said branched portions being wound in a plurality of extended loops which are drawn out of said long continuous resin impregnated fiber strand, with said loops capable of being wrapped about the winding of fibers at the branched portions;
   winding said fiber strand loops tightly around each of the branched portions of the structure; and
   hardening said resin.

2. The method according to claim 1, wherein said loops of the fiber strand are inserted through a plurality of notches which increasingly vary in length in the axial direction of a cylindrical jig wrapped around said branched portion, said fiber strand being squeezed and consequently wound tightly on each of said branched portions by the rotation of said jig.

3. A method for the manufacture of a steering wheel core member, comprising the steps of:
   (a) winding a long continuous resin impregnated fiber strand around the parts of a jig which correspond to a boss metal piece and the ring part of a steering wheel core member;

(b) winding a long continuous resin impregnated fiber strand loop which is drawn out of said long continuous fiber strand which forms said member, tightly around the branched portions of the member at the points of juncture of said spoke parts and the boss metal piece and the branched portions of the member at the points of juncture of said spoke parts and said ring part; and (c) hardening said resin.

4. The method according to claim 3, wherein in step (b) the winding of said long continuous resin impregnated fiber strand is achieved by passing said long continuous fiber strand through a guide groove formed in a cylindrical winding jig which is wrapped around said spoke part, and then rotating said winding jig about the axis thereof.

5. A method for the manufacture of a fiber reinforced resin structure having branched portions, comprising:

winding a long continuous resin impregnated fiber strand repeatedly on a molding jig having a predetermined structure, said fiber strand near each of said branched portions being wound in a plurality of extended loops which are drawn out of said long continuous resin impregnated fiber strand;

inserting said loops of fiber strand through a plurality of notches which vary increasingly in length in the axial direction of a cylindrical winding jig which is wrapped about each of said branched portions;

rotating said jigs to squeeze and tightly wind said looped fiber strands about each of said branched portions; and hardening said resin.

* * * * *